M. A. HOFFMAN.
CURRYCOMB.
APPLICATION FILED APR. 20, 1915.
1,169,644.
Patented Jan. 25, 1916.
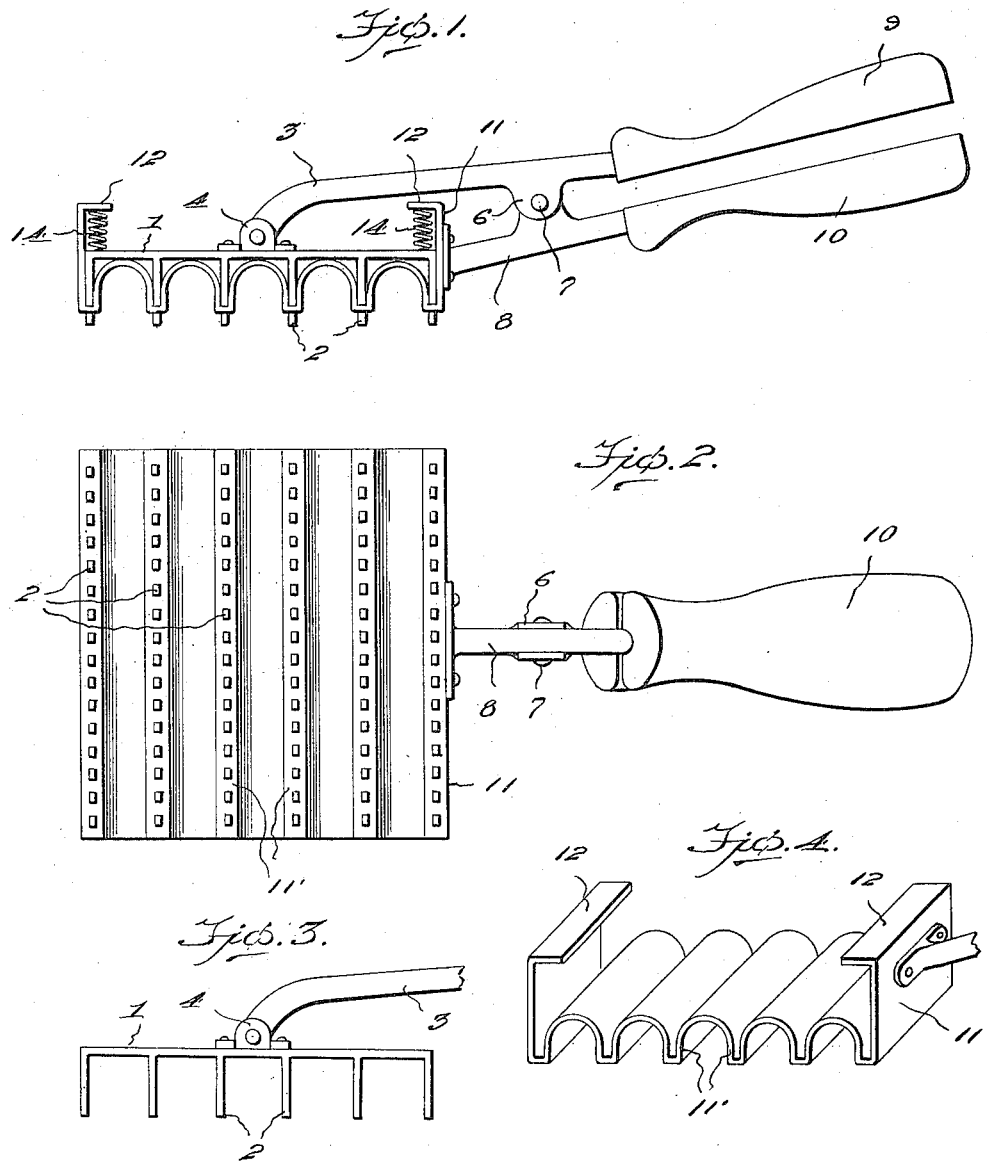

UNITED STATES PATENT OFFICE.

MICHAEL A. HOFFMAN, OF ROCA, NEBRASKA.

CURRYCOMB.

1,169,644.

Specification of Letters Patent.

Patented Jan. 25, 1916.

Application filed April 20, 1915. Serial No. 22,612.

*To all whom it may concern:*

Be it known that I, MICHAEL A. HOFFMAN, a citizen of the United States, residing at Roca, in the county of Lancaster and State of Nebraska, have invented certain new and useful Improvements in Currycombs; and I do hereby declare the following to be a full, clear, and exact description of the invention, such as will enable others skilled in the art to which it appertains to make and use the same.

This invention relates to curry combs, and the primary object of the invention is to provide a curry comb which may be easily and quickly cleaned, by the pressure upon the handle of the same.

Another object of this invention is to provide a curry comb which includes substantially two sections, one of which includes a plate having a plurality of currying teeth formed thereupon, and the second section which includes substantially a guard construction for encompassing the currying teeth, for cleaning them, upon compression of the handle of the curry comb, and also to provide means for holding the teeth in an outwardly extending position at all times, except when pressure is applied to the handle of the comb.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the curry comb assembled, Fig. 2 is a bottom plan view of the curry comb, Fig. 3 is a view of the currying teeth section of the comb, and Fig. 4 is a view of the guard section of the comb, used for cleaning the teeth.

Referring more particularly to the drawings, 1 designates the body plate of the curry comb, which has a plurality of currying teeth 2 secured to the under surface thereof in spaced laterally extending rows. The plate 1 has a bar 3 pivotally connected to the center of its upper surface, as is shown at 4, which bar has downwardly extending ears 6 formed thereupon. The ears 6 are provided with openings 7 extending therethrough, through which a pin extends for pivotally connecting the bar 3 to the bar 8. The bar 3 has a half handle 9 secured to its outer surface, which is adapted for coaction with the half handle 10 which is carried by the bar 8 for forming a handle for the curry comb.

The bar 8 is secured to a plate 11, which is bent intermediate of its ends, for forming a plurality of spaced guard members 11'. The spaced guard members 11' are formed for corresponding with the spacing of the rows of currying teeth 2 which are secured to the plate 1, and they are provided with a plurality of spaced openings through which the teeth 2 extend when the comb is used for the purpose of currying horses or other animals.

The plate 11 has its ends extending upwardly above the guard sections 11', and bent inwardly, as is shown at 12.

When the curry comb is assembled, the tooth carrying plate 1 is positioned intermediate of the flanges 12 of the plate 11, and the teeth 2 extend downwardly through the openings formed in the guard sections 11', as is clearly shown in Fig. 1 of the drawings.

Cushioning spiral springs 14 are mounted upon the corners of the upper surface of the plate 1, and rest against the under surface of the flanges 12, for holding the plate 1 downwardly, and causing the teeth 2 to project beneath the lower perforated surfaces of the guard members 11'.

By pressure upon the handle sections 9 and 10, the plate 1 may be raised upwardly against the tension of the springs 14, for passing the teeth upwardly through the openings which are formed in the guard members 11', for cleaning the teeth or removing hair, or other substance which might have become attached to the currying teeth while currying the animal.

In reducing the invention to practice, certain minor features of construction, combination and arrangement of parts may necessitate alteration to which the patentee is entitled, provided such alterations are comprehended within the scope of what is claimed.

What is claimed is:—

In a curry comb structure, a plate, a plurality of currying teeth secured to the under surface of said plate in spaced laterally extending rows, a bar pivotally secured to said plate, a semi-handle section formed upon the outer end of said bar, a second plate being bent to form guard members spaced for receiving said spaced rows or currying teeth, said guard members being provided with a plurality of openings extending therethrough, through which said currying teeth extend, a bar connected to said second named plate and having a semi-handle connected thereto for coaction with said first named semi-handle for forming a handle for the curry comb, said second named plate having its ends bent upwardly and transversely for forming flanges, springs positioned between the upper surface of said first named body plate and said flanges for normally holding said teeth extended through said openings, said bars being pivotally connected for moving said currying teeth upwardly through said opening for cleaning them upon movement of said semi-handle sections toward each other.

In testimony whereof I affix my signature in presence of two witnesses.

MIKE A. HOFFMAN.

Witnesses:
 GUY S. ABRAHAMS,
 JOHN ABRAHAMS.

Copies of this patent may be obtained for five cents each, by addressing the "Commissioner of Patents. Washington, D. C."